United States Patent [19]

Susmark

[11] Patent Number: 5,697,476

[45] Date of Patent: Dec. 16, 1997

[54] SAFETY BRAKE

[76] Inventor: Reid J. Susmark, HCR 1 Box 1AA, Toivola, Mich. 49965

[21] Appl. No.: 585,494

[22] Filed: Jan. 16, 1996

[51] Int. Cl.$^6$ .................................................. B60T 7/12
[52] U.S. Cl. .......................................... 188/189; 188/82.7
[58] Field of Search ........................... 188/77 R, 85.5, 188/82.6, 82.7, 189

[56] References Cited

U.S. PATENT DOCUMENTS

| | | | |
|---|---|---|---|
| 3,313,330 | 4/1967 | Hoch et al. | 188/77 R |
| 3,799,296 | 3/1974 | Lester | 188/12.8 |
| 4,015,696 | 4/1977 | Lichti | 188/189 |
| 4,282,953 | 8/1981 | Lichti et al. | 188/189 |
| 4,372,430 | 2/1983 | Borugian | 188/329 |
| 4,448,290 | 5/1984 | Reid, Jr. et al. | 188/82.7 |
| 4,582,179 | 4/1986 | Nelson | 188/184 |
| 4,907,679 | 3/1990 | Menke | 188/189 |
| 5,060,758 | 10/1991 | Ishioka | 182/234 |
| 5,127,631 | 7/1992 | Flaig | 254/267 |
| 5,203,392 | 4/1993 | Shea | 160/7 |
| 5,310,028 | 5/1994 | Sampson | 183/329 |

*Primary Examiner*—Robert J. Oberleitner
*Assistant Examiner*—Pamela J. Lipka
*Attorney, Agent, or Firm*—H. Dennis Kelly; Timmons & Kelly

[57] ABSTRACT

A pair of pawl assemblies is mounted on a shaft. Each pawl assembly includes a pawl, an arm and a hub. The arm is attached to the hub by a pivot, and a spring biases the arm toward the hub. The pawl attaches to the end of the arm, and the surface of the pawl has several teeth pointed in the direction of rotation. A brake drum made of two halves is bolted together around the shaft and pawl assemblies. The inner surface of the drum has teeth designed to mesh with the teeth on the pawls. A brake lining band fits around the brake drum in a groove formed along the circumference of the brake drum. The brake lining band attaches to adjustable mounting hardware, which is secured to a fixed surface. When the rotational speed of the shaft exceeds a safe level, the teeth on the pawls engage the teeth in the brake drum, causing the drum to turn against the brake lining band. The friction of turning the drum slows the shaft to a full stop. The teeth in the pawls and brake drum are designed to keep the pawls and the drum engaged even after the shaft stops rotating. A small reverse rotation of the shaft disengages the pawls from the brake drum.

8 Claims, 1 Drawing Sheet

SAFETY BRAKE

BACKGROUND OF THE INVENTION

1. Field of the Invention

This invention relates in general to braking devices. In particular, the invention relates to a shaft brake operating in only one direction, for preventing excessive closing speed of a door driven by a rotating shaft.

2. Description of the Related Art

Numerous devices have been created to prevent excessive rotational speed of a shaft. Such devices would be used, for example, on an overhead door such as a garage door, to prevent the door from slamming shut if the counterweight mechanism failed. Most of the known devices use a pawl to engage a mating surface on the inside of a brake drum, which in turn rotates against a brake lining. Most of these devices cannot be mounted on a installed shaft, requiring either that the brake be installed when the shaft is installed, or that the equipment surrounding the shaft be removed for installation of the brake. Most existing devices also are complex and require a number of finely machined parts, increasing cost and the likelihood of failure. Some cannot be easily reset after the brake is engaged.

A need remained for a safety brake that can be installed on a shaft that is already in place without moving the shaft or any connecting equipment. A brake that can be reset easily, without any disassembly, after the emergency condition is remedied, was also desired. A brake having a minimum of parts that is inexpensive to make and simple to use was also desired. Finally, a brake designed to operate without the need for maintenance or lubrication was also desired.

SUMMARY OF THE INVENTION

The general object of the invention is to stop rotation of a shaft driving a door when the shaft's rotational speed exceeds a safety limit. Another object of the invention is to keep the brake engaged even after the shaft stops turning. A third object is that the device be simple and inexpensive to make. Still another object is that the brake be capable of being installed in place on an existing shaft, without removing the shaft from its supports or visa versa.

In general, these objects are achieved by a pair of pawls that mount on the shaft, and a brake drum made up of two brake drum halves that bolt together around the pawls and the shaft. The pawls are fixed to the end of arms that pivotably attach to hubs. The hubs in turn bolt onto the shaft. Springs bias the arms toward the hubs. Rotation of the shaft causes the arms to swing away from the hubs under centrifugal action. The pawls have teeth, inclined toward the direction of rotation the brake is intended to protect. The brake drum has teeth on its inner surface that are designed to mesh with the teeth on the pawls. A brake lining band fits around the brake drum, and is secured to a fixed surface through a mounting bracket and a plate. The arms are the only moving parts under normal operation, so essentially maintenance-free operation can be achieved by using a self-lubricating pivot.

When the shaft's rotational speed exceeds a safe limit, the pawls will engage the teeth on the brake drum, forcing the brake drum to turn against the brake lining band. The frictional force exerted by the lining band against the drum slows the shaft to a complete stop. The pawl and drum remain engaged even when the shaft comes to a stop.

The above, as well as additional objects, features, and advantages of the invention will become apparent in the following detailed description and in the drawings.

DESCRIPTION OF THE PREFERRED EMBODIMENT

Figure 1:
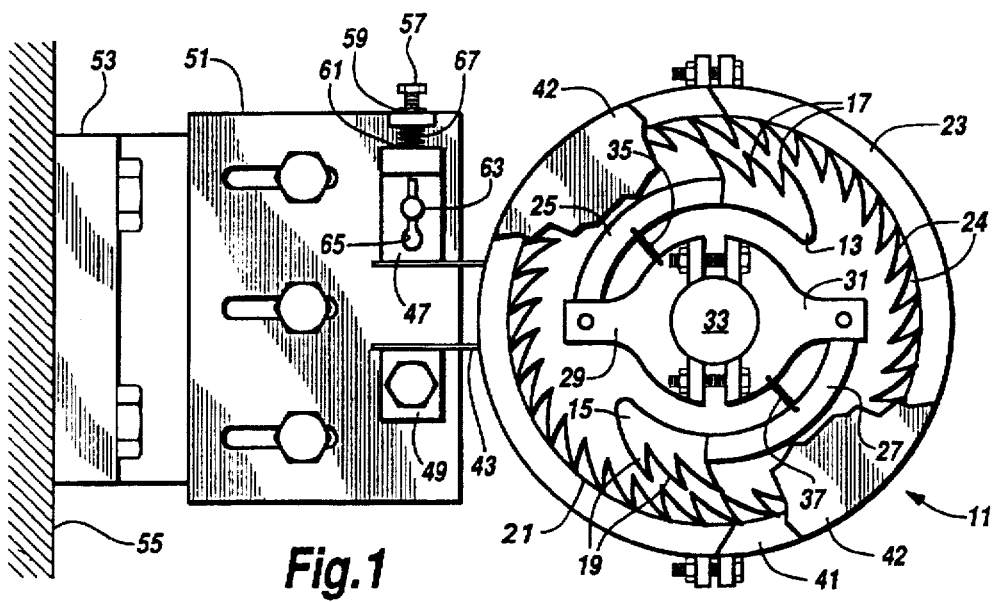
FIG. 1 is side elevation of a safety brake according to the invention, as it appears when installed.

As shown in FIGS. 1 through 4, the safety brake 11 includes two pawls 13 and 15 that have teeth 17 and 19 designed to engage a mating surface 21 on a brake drum 23. The pawls 13 and 15 are affixed to the end of arms 25 and 27 pivotably attached to hubs 29 and 31. The hubs 29 and 31 bolt together onto a shaft 33. A spring 35 and 37 is attached between each arm 25 and 27 and the corresponding hub 29 and 31, and biases the arm 25 and 27 toward the portion of the hub 29 and 31 surrounding the shaft 33. The arms 25 and 27 pivot away from the shaft 33 under centrifugal action when the shaft 33 rotates.

The brake drum 23 has two halves 39 and 41 that bolt together around the shaft 33 and the pawls 13 and 15. Brake cover plates 42 bolt onto the drum halves 39 and 41, and help center the drum 23 around the shaft 33 and protect the parts from contaminants. The surface 21 of the brake drum 23 has teeth 24 designed to mesh with the teeth 17 and 19 on the pawls 13 and 15. The teeth 17, 19, and 24 are inclined so that they engage in only one direction of rotation. When the teeth 17,19, and 24 first engage, further rotation of the shaft 33 urges the teeth 17, 19, and 24 to mesh together, preventing the pawls 13 and 15 from disengaging from the brake drum 23.

Figure 2:
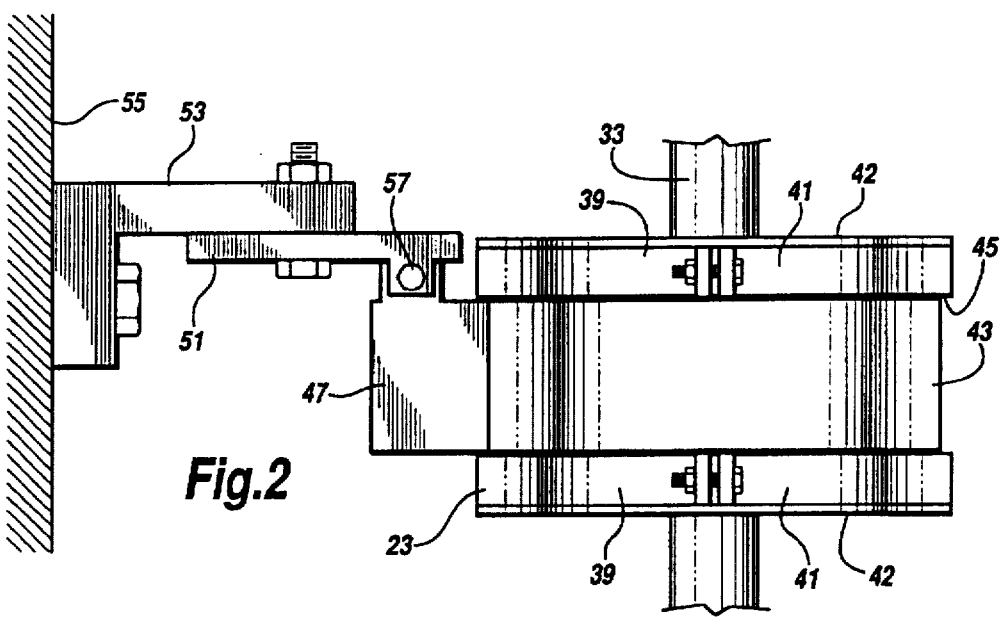
FIG. 2 is a top plan view thereof.
Figure 3:
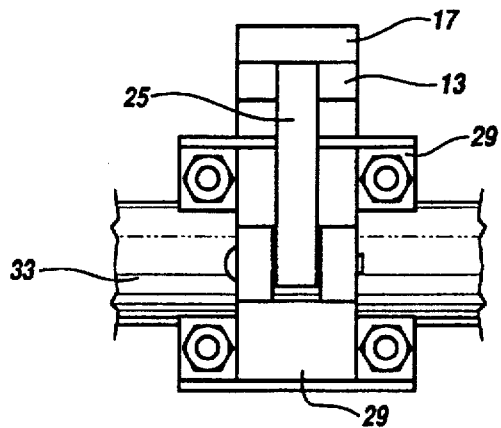
FIG. 3 is a front partially exploded view of the brake drum and the pawl elements.

As shown in FIGS. 1 and 2, a brake lining band 43 straps around the brake drum 23, and is held within a groove 45 formed in the drum 23. Brackets 47 and 49 secure the brake lining band 43 to a plate 51 that in turn is bolted to a mounting bracket 53 that is secured to a fixed surface 55, such as a wall or beam. The position of the plate 51 relative to the mounting bracket 53 is adjustable, to allow for varying distances between the shaft 33 and the nearest fixed surface 55.

When the pawls 13 and 15 engage the drum 23, the drum 23 is urged to turn against the fixed brake lining band 43. Friction between the drum 23 and the band 43 slows the shaft 33 to a complete stop. The rotational speed at which the pawls 13 and 15 engage the drum 23 can be adjusted by the use of pawl arm springs 35 and 37 having different stiffnesses. The pawls 13 and 15 and the brake drum 23 remain engaged even when the shaft 33 stops rotating. The pawls 13 and 15 are disengaged from the brake drum 23 by rotating the shaft 33 in the opposite direction.

Tension on the brake lining band 43 is adjusted by means of an adjustment bolt 57 passing through a threaded hole 59 in the plate 51. The bolt 57 engages and compresses a spring 67 attached to the upper band bracket 47. The upper band bracket 47 is secured to the plate 51 by a pin 63 passing through a slot 65 in the bracket 47. This arrangement allows the bracket 47 to slide along the plate 51. The spring 67 maintains tension on the brake lining band 43 as the brake drum 23 turns. This is necessary, otherwise heating of the brake lining band 43 during operation would cause it to expand, causing braking force to decrease.

Installation of the safety brake 11 is straightforward. The plate 51 and mounting bracket 53 are mounted on a suitable fixed surface 55. The pawl hubs 29 and 31 are bolted to the shaft 33 in the appropriate location, with the pawl teeth 17 and 19 pointing in the direction in which the shaft 33 turns when braking is desired. The brake drum halves 39 and 41 are assembled around the shaft 33 so that the teeth 24 on the brake surface 21 will engage the teeth 17 and 19 on the pawls 13 and 15. The drum covers (not shown) can then be installed. The brake lining band 43 is inserted into the groove 45 in the drum 23, and the bottom bracket 49 is secured to the plate 51. The top bracket 47 is slipped onto the pin 63, and the adjustment bolt 57 and spring 67 are installed and adjusted.

Under normal operation, the shaft 33 rotates at a relatively slow rate, so the arms 25 and 27 do not extend far away from the hubs 29 and 31. In an emergency situation, the shaft 33 will suddenly rotate much faster than it does under normal conditions. The arms 25 and 27 will extend away from the hubs 29 and 31 enough for the pawl teeth 17 and 19 to engage the teeth 24 in the brake drum 23, forcing the drum to turn against the brake lining band 43. This provides braking force to stop the rotation of the shaft 33. More than one safety brake 11 may be mounted on a shaft 33, their combined braking force stopping the shaft 33. This may be necessary when the clearance between the shaft 33 and the fixed surface 55 is too small for a single brake 11 having adequate braking force. The use of multiple brakes 11 also allows a greater range of desired braking force to be addressed with a single size of brake 11, reducing inventory and manufacturing costs.

The safety brake of the invention has several advantages over the prior art. The safety brake can be constructed simply and inexpensively. It is extremely rugged and durable. It has no complicated moving parts, and can be easily installed and removed.

The invention has been shown in only one embodiment. It should be apparent to those skilled in the art that the invention is not so limited, but is susceptible to various changes and modifications without departing from the spirit of the invention.

What is claimed is:

1. A safety brake for use with a door that is opened and closed by a rotating shaft, wherein the safety brake comprises:

at least one arm;

at least one pawl connected to each arm;

a hub pivotably connected to the arm and adapted to be mounted on and to rotate with the shaft, the arm being biased toward the hub;

a brake drum, having a first half and a second half, said first half and said second half being distinct separable parts the first and second halves being adapted to be assembled around the shaft, encircling the pawl, the inner surface of the brake drum being adapted to engage the pawl;

mounting means for attaching the safety brake to a fixed surface; and a brake lining band, attached to the mounting means and frictionally contacting the brake drum, the brake drum rotating against the brake lining when the pawl engages the inner surface of the brake drum.

2. A safety brake as recited in claim 1, wherein the mounting means is a plate having slots, and a mounting bracket slidably engaging the plate.

3. A safety brake as recited in claim 1, further comprising drum covers adapted to attach to the brake drum in the plane perpendicular to the axis of the shaft, for covering the brake drum and for centering the brake drum around the shaft.

4. A safety brake as recited in claim 1, further comprising tension adjusting means, attached to the mounting means, for adjusting the tension of the brake lining band on the brake drum.

5. A safety brake as recited in claim 1, wherein a spring provides the force biasing the arm toward the hub in the pawl assembly.

6. A safety brake for use with a door that is opened and closed by a rotating shaft, wherein the safety brake comprises:

at least on arm;

at least one pawl connected to each arm;

a hub pivotably connected to the arm and adapted to be mounted on and to rotate with the shaft, the arm being biased toward the hub;

a brake drum, having a first half and a second half, said first half and said second half being distinct separable parts the first and second halves being adapted to be assembled around the shaft, encircling the pawl, the inner surface of the brake drum being adapted to engage the pawl;

a plate having slots;

a mounting bracket attached to a fixed surface, the bracket slidably engaging the plate; and a brake lining band, attached to the plate and frictionally contacting the brake drum, the brake drum rotating against the brake lining when the pawl engages the inner surface of the brake drum.

7. A safety brake as recited in claim 6, further comprising drum covers adapted to attach to the brake drum in the plane perpendicular to the axis of the shaft, for covering the brake drum and for centering the brake drum around the shaft.

8. A safety brake as recited in claim 6, further comprising tension adjusting means, attached to the plate, for adjusting the tension of the brake lining band on the brake drum.

* * * * *